(12) United States Patent
Bender

(10) Patent No.: US 8,463,818 B2
(45) Date of Patent: Jun. 11, 2013

(54) SINGLE COMMAND DATA WAREHOUSE TABLE UPDATE

(75) Inventor: Michael Bender, Rye Brook, NY (US)

(73) Assignee: International Business Machines Corporation, Armonk, NY (US)

( * ) Notice: Subject to any disclaimer, the term of this patent is extended or adjusted under 35 U.S.C. 154(b) by 35 days.

(21) Appl. No.: 13/285,281

(22) Filed: Oct. 31, 2011

(65) Prior Publication Data

US 2013/0110881 A1 May 2, 2013

(51) Int. Cl.
*G06F 7/00* (2006.01)
*G06F 17/30* (2006.01)

(52) U.S. Cl.
USPC .......................................... 707/792; 707/803

(58) Field of Classification Search
USPC .................................. 707/792, 803
See application file for complete search history.

(56) References Cited

U.S. PATENT DOCUMENTS

| | | | |
|---|---|---|---|
| 2004/0010507 A1 | 1/2004 | Bellew | |
| 2007/0136330 A1* | 6/2007 | Lecheler-Moore et al. | 707/100 |
| 2007/0203933 A1* | 8/2007 | Iversen et al. | 707/102 |
| 2008/0281846 A1 | 11/2008 | Hoang et al. | |
| 2008/0288448 A1* | 11/2008 | Agredano et al. | 707/2 |
| 2009/0319487 A1 | 12/2009 | Carlin et al. | |
| 2011/0125705 A1* | 5/2011 | Aski et al. | 707/602 |

OTHER PUBLICATIONS

Arshad Ali, Using Merge in SQL Server to insert, update and delete at the same time, Mar. 10, 2009, 4 pp.

* cited by examiner

*Primary Examiner* — Kuen Lu

(74) *Attorney, Agent, or Firm* — Patrick J. Daugherty; Driggs, Hogg, Daugherty & DelZoppo Co., LPA

(57) ABSTRACT

Information warehouse table data is updated through a full outer join between warehouse tables and source tables in response to a single query language command statement of a relational database computer language. The single command statement comprises table mapping instructions for updating the warehouse tables that define matching conditions, delete instructions, archive instructions, and update instructions. The full outer join inserts rows in the warehouse tables for source table data rows that do not have corresponding matching rows in the warehouse table. Data rows in the warehouse tables without corresponding matching source table rows are deleted if a value of a parameter in the warehouse table system is set to delete; updated if the parameter is update; and updated with archive values and a new table row inserted with existing values if the parameter is archive.

20 Claims, 2 Drawing Sheets

SINGLE COMMAND DATA WAREHOUSE TABLE UPDATE

TECHNICAL FIELD

The present invention relates to updating dimensional data and fact tables in information warehousing databases.

BACKGROUND

The terms "Information Warehouse" and "Data Warehouse" refer generally to relational database management systems (RDBMS) and to the associated programming language command tools and processes used in the storage, retrieval and analyzing of the data in database tables structures defined therein. Information Warehouse databases are generally organized with respect to dimensional data and fact tables. A dimension is a data element that categorizes each item in a data set into non-overlapping regions, and provides structured labeling information to otherwise unordered numeric measures. For example, "Customer", "Date", and "Product" are all dimensions that could be applied meaningfully to a sales receipt.

Fact tables comprise measurements, metrics or facts of a business or other process, and are organized in a schema, a logical arrangement of tables in a multidimensional database, and surrounded by dimension tables. Fact tables provide the values that act as independent variables by which dimensional attributes may be analyzed. For example, a sales fact table may be considered with respect to "sales volume by day by product by store," wherein each record in the fact table is uniquely defined by a day, product and store.

Updating data warehouse tables may be complicated and costly in terms of programming overhead, generally requiring the design and implementation of batch flows or procedures to execute a series of individual programming language database operation commands, and which often must be customized for every update event. Additional database staging tables are also generally required to handle data during updating. Such process not only leads to undesired overhead for build costs and ongoing maintenance, but as the update process can fail at anytime during any of multiple steps, table locking and restart procedures must also be taken into consideration.

BRIEF SUMMARY

In one embodiment of the present invention, a method for updating table data in an information warehouse via a single query language command includes a processing unit of a database management system performing a full outer join between one or more warehouse tables and one or more source tables in response to a single query language command statement of a relational database computer language. The single query language command statement comprises table mapping instructions for updating the warehouse tables of an information warehouse database system with data from the source tables that define matching conditions, delete instructions, archive instructions, and update instructions. Thus, the processing unit performs the full outer join by inserting rows in the warehouse tables for source table data rows that do not have a corresponding matching row in the warehouse table. With respect to first data rows in the warehouse tables that do not have a corresponding matching row in the source table, the processing unit deletes the first data row if a value of a treat history parameter in the warehouse table system is set to delete; updates the first data row with update values if the warehouse table system treat history parameter is set to update; and updates the first data row with archive values and inserts a new table row into the warehouse tables that comprises existing values from the first data row if the warehouse table system treat history parameter is set to archive. Lastly, for any second data row in the warehouse tables that has a corresponding matching row in the source tables, the processing unit updates the second data row with data from the corresponding matching row in the source tables, and also inserts a new table row into the warehouse table comprising existing values from the second data row if the warehouse table system treat history parameter is set to archive.

In another embodiment, a method for providing a service for authorizing and executing updating of table data in an information warehouse via a single query language command includes providing one or more articles, including a command interface of a relational database management system that receives from a user a single query language command statement of a relational database computer language comprising table mapping instructions for updating information warehouse table data with data from a source table, the mapping instructions defining matching conditions, delete instructions, archive instructions, and update instructions. A command executor performs a full outer join of the warehouse table data with data from the source via implementing the mapping, delete, archive, and update instructions of the single query language command statement as a function of the value of a treat history parameter specified in a warehouse table system of the information warehouse table. A first level valuator validates the command statement by determining if the user providing the single query language command statement has authorization to the source table data via a security process implemented in a database management system of the information warehouse table. A second level valuator determines a locking/unlocking authority of the user, if the user is authorized by the first level valuator, and unlocks the table if locked and locks out other users of the information warehouse table during the join if determined that the user is authorized to lock and unlock the information warehouse table.

In another embodiment, an article of manufacture has a tangible computer readable storage medium device with computer readable program code embodied therewith, the computer readable program code comprising instructions that, when executed by a computer processor, cause the computer processor to perform a full outer join between one or more warehouse tables of a database management system with one or more source tables in response to a single query language command statement of a relational database computer language. The single command statement comprises table mapping instructions for updating the warehouse tables of an information warehouse database system with data from the source tables that define matching conditions, delete instructions, archive instructions, and update instructions. Thus, the computer processor performs the full outer join by inserting rows in the warehouse tables for source table data rows that do not have a corresponding matching row in the warehouse table. With respect to first data rows in the warehouse tables that do not have a corresponding matching row in the source table, the computer processor deletes the first data row if a value of a treat history parameter in the warehouse table system is set to delete; updates the first data row with update values if the warehouse table system treat history parameter is set to update; and updates the first data row with archive values and inserts a new table row into the warehouse tables that comprises existing values from the first data row if the warehouse table system treat history parameter is set to archive. Lastly, for any second data row in the warehouse tables that has a corresponding matching row in the source tables, the computer processor updates the second data row with data from the corresponding matching row in the source tables, and also inserts a new table row into the warehouse table comprising existing values from the second data row if the warehouse table system treat history parameter is set to archive.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
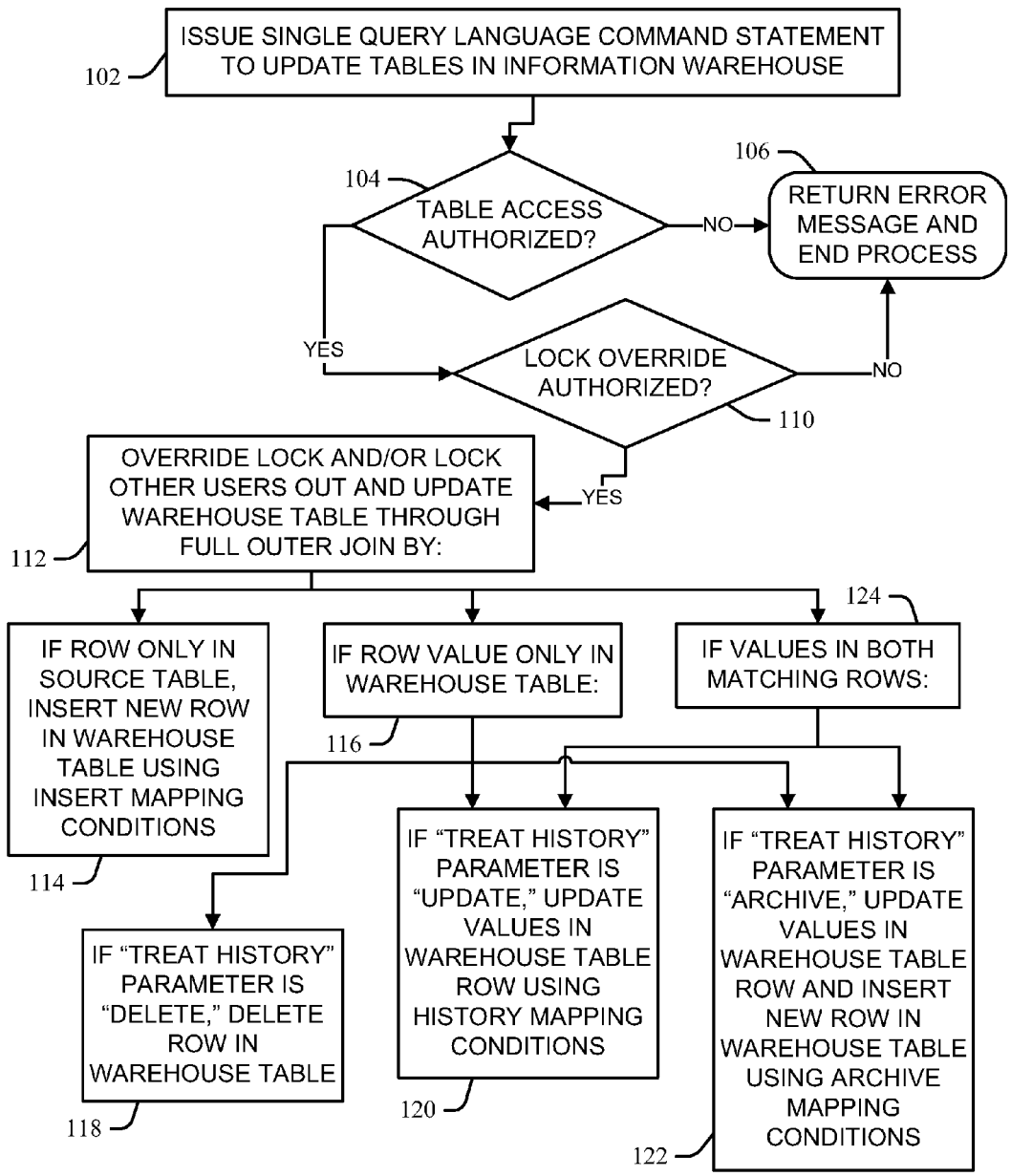
FIG. 1 is a block diagram illustration of a method or system according to the present invention for updating dimension data tables in an information warehouse through a query language interface via a single query language command.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Updating dimensional data and fact tables in an information warehouse is a common task for programmers, but one that may be repetitive and costly with respect to time and that may also require the building of extra database objects. Moreover, updating solutions commonly need to be performed in a batch sequence to accomplish intended changes to a database, which is itself costly in development time and increases the complexity of other data warehouse processes and solutions. For example, common prior art approaches typically require building a batch flow or procedure to execute a series of different relational database management system commands, including: a first command to join an updating source table and the information database table to be updated and to create a staging table for deltas (values of the differences) between the respective table data; a next command to delete rows marked for deletion; another, next command to update existing records with history information; a further next command to update existing records if no history was needed; and finally a command to add rows to the table.

Such prior art processes leave much to be desired. First, there is the extra development cost of building a batch flow that is customized for every issued command. A staging table is also required, which must be built and then maintained as part of the warehouse database, leading to build and ongoing maintenance costs. The multiple steps in series dependency require a consideration of table locking and restart procedures, and may lead to failure at any one step.

Query languages are declarative computer languages intended for use with relational databases and comprehending data insert, query, update and delete commands, as well as schema creation and modification and other data access control command processes. One commonly used query language is SQL (Structured Query Language), which was developed at International Business Machines Corporation, and wherein some versions may be called "SEQUEL" or Structured English Query Language, though other query languages may be practiced with embodiments of the present invention. Problems may arise when if query language features are not in accordance with the semantics of a basic relational model, or with its tuple calculus realization. In one example, custom batch updating commands are generally not implemented from an SQL interface with satisfactory performance due to input/output (I/O) opportunity constraints. Thus, the prior art generally teaches away from using query language command processes for information warehouse database updating.

FIG. 1 illustrates a method or process according to the present invention for the authorization and execution of updating dimension data and fact data tables in an information warehouse through a query language interface via a single query language command. At 102 a user issues a single query language command statement through an query language interface to update dimension and/or fact table data in an information warehouse database structure. The single command comprises table mapping instructions for updating a warehouse table with data from a source table; delete, archive, and update instructions, wherein implementation of each is dependent upon the value of a "treat history" or other specified parameter in the warehouse table system. The command statement joins a warehouse table (target) with a table that would have refreshed data of the original (source table), wherein the target table is updated based on the outcome of this join, with the option of setting rules to update different values, handle changes and deletes as per a programmer's desire.

At 104 a processing unit of a database management system validates the single query language command statement in a first level process by determining if the user has authorization to the source table data used for the update, and to the fact and/or dimensional table data of the information warehouse database structure, via a security process implemented in the database management system. If determined that the user is not authorized, then at 106 the processing unit ends the request and returns an error message to the user. Otherwise, if authorized at 104 then in a second level authorization the database management system processing unit determines at 110 whether the user is also authorized to override any locks on the table to be updated, and if not then again returns an error message at 106 and ends the process. Otherwise, if determined that the user has locking/unlocking authorization at 110, then at 112 a processing unit gives control of the table to be updated to the user during the updating process, overriding any lock on the table by another user and also locking out other users from locking the table, and processes the single command statement using memory and standard caching and buffers of the database management system. Generally, the override to the lock will result in the termination of the command that resulted in the table being locked, and the returning of an error message to said locking process, as well as to a subsequent request to lock the table by another user until the join process is completed.

Processing the single query language command statement at 112 comprises performing a full outer join between the existing dimension and fact tables in the information warehouse database structure and updating "source" tables based on "MATCHING ON" conditions defined by the single command statement. More particularly:

(i) for rows where a value is only in the source table (without a corresponding matching row in tables of the warehouse being updated), at 114 the source table row is inserted into a dimension or fact table of the information warehouse database structure using pre-defined insert mapping conditions of the data model of the information warehouse to assign the values;

(ii) for rows where a value is not in the updating source table but only in the corresponding information warehouse dimension or fact table, one of three actions is instigated at 116, chosen based upon the setting of the "TREAT HISTORY" parameter in the business purpose or data model of the information warehouse being updated, namely:

if the TREAT HISTORY parameter is set to "delete," then the row is deleted at 118;

if the TREAT HISTORY parameter is set to "update," then the row is updated at 120 with values according to historical mapping conditions pre-set for the business purpose or data model of the information warehouse; or if the TREAT HISTORY parameter is set to "archive," then at 122, the warehouse row is updated with values, and a new table row is inserted into the warehouse table, each with values assigned pursuant to archive mapping conditions pre-set for the business purpose or data model of the information warehouse; and (iii) for rows where the value is in both the source and the corresponding information warehouse tables, either the "update" action 120 or the "archive" action 122 is instigated at 124, again chosen based upon the "TREAT HISTORY" parameter and respective update or archive mapping conditions set in the business purpose or data model of the information warehouse being updated.

More particularly, the single query language command of the present embodiment can effect all row insertions and deletions, updates or archival actions for each of the relevant warehouse table rows of a given warehouse, without requiring a batch series of commands, each instead achieved through recognizing the pre-set policy of that warehouse. The same, single query language statement may delete rows in a first warehouse, update rows in a second warehouse, and archive warehouse table rows in a third warehouse, in each scenario without the necessity of building and running a custom series of batch routines for any of the warehouses to handle any of the desired conditions.

The update 120 and archive 122 processes are distinguished in their treatment of the data found in the warehouse table when the source table has no match for the data. In the update process 120, new record data in the source table generally replaces the original record data in the warehouse table being updated, and only the most recent dimensional values are stored and previous (historical) values are no longer available. For example, where a person changes their name through marriage or other event, the policy of a warehouse may be to update the name as associated with all data and not to maintain an association of the data with the previous name. In contrast, in an "archive" process at 120, the original warehouse record may be modified to reflect updated values, and an extra archival row also added in the warehouse table to contain the previous (historical) dimensional value, and optionally data regarding the archival nature of the data (for example, a time or date stamp noting the archival event).

Thus, embodiments of the present invention provide mass updates, insertions, and deletions of rows based on comparing the data in one table to that of another table, a multi-option ability to update dimensional data and fact data by deleting inactive records at 118, flagging them as inactive at 120, or keeping them as historical information at 122, via a user issuing a single query language statement, as opposed to the multiple pass processes that are required to effect the same actions under the prior art.

One example of a single SQL command statement according to the present invention comprises the following format: "IWUPDATE <target dimension table> FROM <source table> MATCHING ON <standard sql "where" conditions> MAPPING <dimension.col$_1$={source column, calculation, fixed value}...dimension.col$_n$={source column, calculation, fixed value}>TREAT HISTORY as {delete, archive, update} HISTORICAL MAPPING=<standard SQL assignment> ARCHIVE MAPPING=<standard SQL assignment>", though other single statement nomenclature and commands may be practiced.

Embodiments of the present invention avail themselves of existing functionality for data authorization in a given warehouse system for update access at 104 and for checking for locked tables at 110, and also incorporate a new level of entitlement authorization added to the information warehouse database space for authorization to override any current table locks and force the other locking users off, which enables less work in automating repeatable processes without manual intervention than would be required under the prior art. Thus, when an updating user has the authorization to override a lock at 110, at 112 the system overrides the lock, resulting in the termination of the command that resulted in the table being locked, and the returning of an error message to said locking process; the system also forces any existing authorized user off the tables using existing system processes, and wherein the user thus forced off may also receive an error message. These lock-overriding attributes of the process at 112 are not taught or practiced by the prior art.

However, if instead the update requested is issued by a single query language command without the appropriate authorization for the user as defined in the security/authorization tables at 104 or 110, the issuer of the command receives an error message. In either case no additional commands or applications are required, but instead the process is self-implementing through the single query language command, wherein the existing functionality for data access and table locking of the data warehouse is utilized.

Thus, the database management system processes the new query language statement, joining the existing table with the source table comprising the updates through utilizing existing functionality to perform a full outer join. The result set of this join is stored in memory and/or storage, depending on database setup and available memory and storage. The database management system then treats each row of the result set as needed based on the parameters passed with the query language statement, with existing functionality used to process the inserts, updates or deletes as indicated.

It will be appreciated that the single statements can be issued to any underlying database system that supports a query language interface, and a wide variety of query language techniques for defining or getting field values may be incorporated in the command. One example uses SQL calculation routine queries and hard coding routines (such as "select current date," or "select current date plus three days," etc.) Embodiments may also be practiced with SQLite and other relational database management systems and applications, and may also be enabled by "Extract, Transform and Load" (ETL) tools, which generally refer to tools that can extract update data from outside sources, transform the data to fit operational needs and then load the transformed data into an end target data warehouse or database, and wherein intermediate staging table may be removed. Examples of ETL tools include DataStage®, Informatica®, and "BusinessObjects Data Services" by SAP Corporations. (DATASTAGE is a trademark of the International Business Machines Corporation in the United States or other countries; INFORMATICA is a trademark of the Informatica Corporation in the United States or other countries). However, one skilled in the art will appreciate that the present invention is not limited to the specific query language examples and embodiments described herein.

Figure 2:
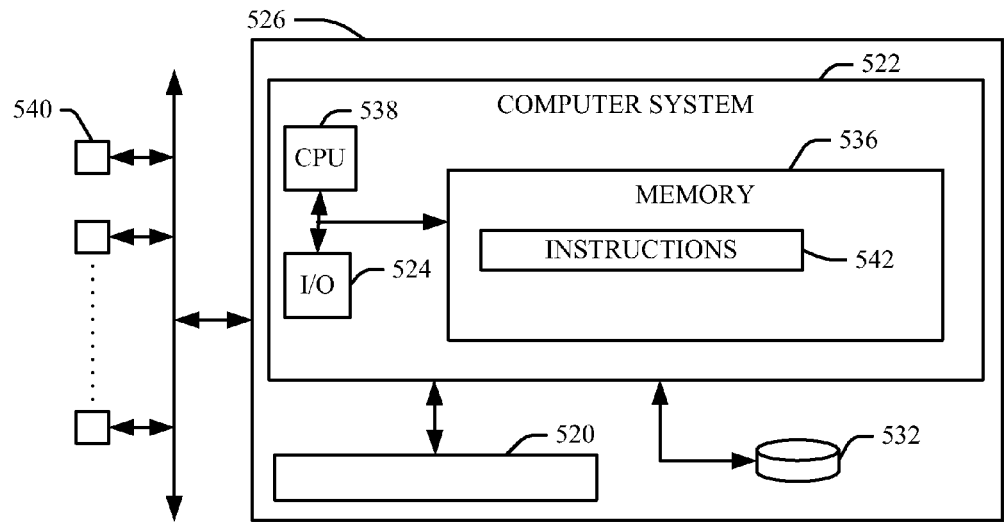
FIG. 2 is a block diagram illustration of a computerized implementation of an embodiment of the present invention.

Referring now to FIG. 2, an exemplary computerized implementation of an embodiment of the present invention includes a computer or other programmable device 522 in communication with one or more updating database source tables 540. Instructions 542 reside within computer readable code in a computer readable memory 536, or in a computer readable storage system 532, or other computer readable storage medium that is accessed through a computer network infrastructure 526 by a processing unit (CPU) 538. Thus, the instructions, when implemented by the processing unit (CPU) 538, cause the processing unit (CPU) 538 to update tables in an information warehouse database 540 or another input/output (I/O) device 524 through a single command as described above with respect to FIG. 1.

Figure 3:
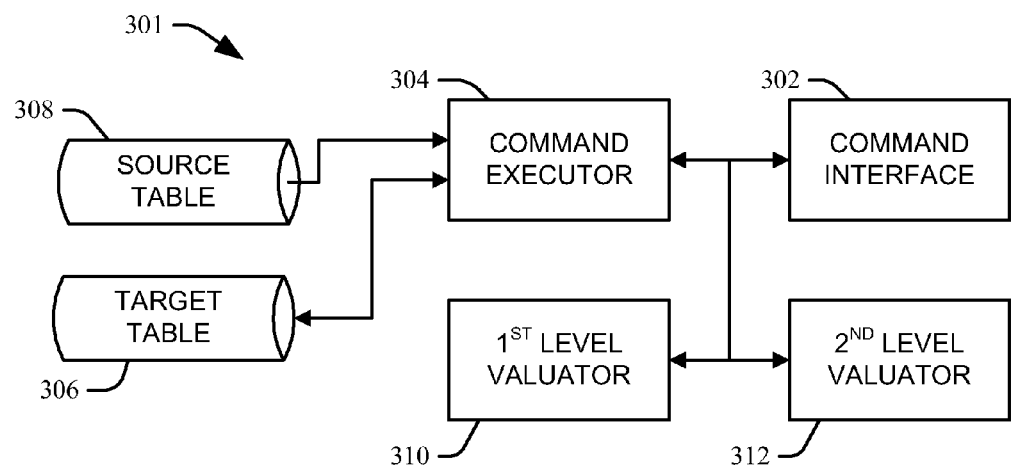
FIG. 3 is a block diagram illustration of an article according to the present invention.

FIG. 3 illustrates an embodiment of an article 301 (for example, a programmable device, system, etc.) according to the present invention that authorizes and executes updating of dimension data and fact data tables in an information warehouse via a single command. One or more of the components of the article 301 are tangible devices that perform specific functions, for example comprising a processing unit, a computer readable memory and a tangible computer readable storage medium. More particularly, a Command Interface 302 of a relational database management system receives a single command statement of a relational database computer language comprising table mapping instructions for updating information warehouse table data with data from a source table, the mapping instructions defining matching conditions, delete instructions, archive instructions, and update instructions. A Command Executor 304 performs a full outer join of data of a warehouse Target Table 306 with data from an updating Source Table 308 via implementing mapping, delete, archive, and update instructions of the single command statement as a function of the value of a "treat history" or other specified parameter in the warehouse table system of the Target Table 306. A First Level Valuator 310 validates the single command statement by determining if a user providing the single command statement through the Command Interface 302 has authorization to the Source Table 308 data used in the join via a security process implemented in the database management system of the Target Table 306, and thus allows the join to proceed or ends the process and returns an error message to the user. If the user is authorized by the First Level Valuator 310, then a Second Level Valuator 312 determines the locking/unlocking authority of the user; if authorized, the table is unlocked if locked and other users are locked out of the table during the join; else an error message is returned to the user and the process ended. In some embodiments, the Second Level Valuator overrides the lock on the table if locked and locks out other users of the information warehouse table during the join by terminating a command that resulted in the overridden table lock or attempts to lock the at least one warehouse table by such other locked-out users, and returns an error message in response to a locking process generating the terminated command.

Embodiments of the present invention may also perform process steps of the invention on a subscription, advertising, and/or fee basis. That is, a service provider could offer to authorize and execute updating of dimension data and fact data tables in an information warehouse via a single command as described above with respect to FIGS. 1-3. Thus, the service provider can create, maintain, and support, etc., a computer infrastructure such as the network computer system 522, network environment 526, or parts thereof, or the article 301, that perform the process steps of the invention for one or more customers. In return, the service provider can receive payment from the customer(s) under a subscription and/or fee agreement and/or the service provider can receive payment from the sale of advertising content to one or more third parties. Services may comprise one or more of: (1) installing program code on a computing device, such as the computers/devices 522/301, from a computer-readable medium device 536, 520 or 532; (2) adding one or more computing devices to a computer infrastructure; and (3) incorporating and/or modifying one or more existing systems of the computer infrastructure to enable the computer infrastructure to perform the process steps of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the Figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for updating table data in an information warehouse via a single query language command, the method comprising:

in response to a single query language command statement of a relational database computer language comprising table mapping instructions for updating at least one information warehouse table of an information warehouse database system with data from at least one source table, wherein the single query language command statement mapping instructions define matching conditions, delete instructions, archive instructions, and update instructions, a processing unit of a database management system:

performing a full outer join between the at least one warehouse table and the at least one source table based on the command matching conditions defined by the single query language command statement by:

for a data row in the at least one source table that does not have a corresponding matching row in the at least one warehouse table, inserting a row in the at least one warehouse table;

for any first data row in the at least one warehouse table that does not have a corresponding matching row in the at least one source table:

deleting the first data row if a value of a treat history parameter in the warehouse table system is set to delete;

updating the first data row with update values if the warehouse table system treat history parameter is set to update; and updating the first data row with archive values and inserting a new table row into the at least one warehouse table that comprises existing values from the first data row if the warehouse table system treat history parameter is set to archive; and for any second data row in the at least one warehouse table that has a corresponding matching row in the at least one source table:

updating the second data row with data from the corresponding matching row in the at least one source table; and inserting a new table row into the at least one warehouse table comprising existing values from the second data row if the warehouse table system treat history parameter is set to archive.

2. The method of claim 1, wherein the step of performing the full outer join between the at least one warehouse table and the at least one source table based on the command matching conditions defined by the single query language command statement is performed without requiring an executing of each of a series of batch flow commands.

3. The method of claim 2, wherein the single query language command statement is an SQL statement.

4. The method of claim 3, wherein the steps of inserting and updating rows in the at least one warehouse table comprise using pre-defined mapping, insert, updating and archival conditions of the data model of the information warehouse to assign respective table values.

5. The method of claim 4, further comprising:
locking out other users from access to or locking the at least one warehouse table during the step of performing the full outer join between the at least one warehouse table and the at least one source table.

6. The method of claim 5, further comprising:
determining if a user providing the SQL command statement has authorization to data in the at least one source table;
determining if the user providing the SQL command statement is authorized to override a lock on the at least one warehouse table if determined that the user providing the SQL command statement has authorization to the data in the at least one source table; and
overriding a lock on the at least one warehouse table and locking out other users from locking the at least one warehouse table if determined that the user providing the SQL command statement is authorized to override the lock.

7. The method of claim 6, further comprising:
in response to the overriding the lock on the at least one warehouse table and the locking out other users from locking the at least one warehouse table, terminating a command that resulted in the overridden table lock or attempts to lock the at least one warehouse table by another locked-out user; and
returning an error message in response to a locking process generating the terminated command.

8. The method of claim 7, wherein the step of performing the full outer join between the at least one warehouse table and the at least one source table based on the command matching conditions defined by the single command statement is enabled by an extract, transform and load tool that extracts update data from the at least one source table, transforms the extracted data to fit an operational need and then loads the transformed data into at least one warehouse table without using an intermediate staging table.

9. A method for providing a service for authorizing and executing updating of table data in an information warehouse via a single query language command, the method comprising:
providing a command interface of a relational database management system that receives from a user a single query language command statement of a relational database computer language comprising table mapping instructions for updating information warehouse table data with data from a source table, the mapping instructions defining matching conditions, delete instructions, archive instructions, and update instructions;
providing a command executor that performs a full outer join of the warehouse table data with data from the source via implementing the mapping, delete, archive, and update instructions of the single query language command statement as a function of the value of a treat history parameter specified in a warehouse table system of the information warehouse table;
providing a first level valuator that validates the single query language command statement by determining if the user providing the single query language command statement has authorization to the source table data via a security process implemented in a database management system of the information warehouse table; and
providing a second level valuator that determines a locking/unlocking authority of the user if the user is authorized by the first level valuator, and which overrides a lock on the table if locked and locks out other users of the information warehouse table during the join if determined that the user is authorized to lock and unlock the information warehouse table.

10. The method of claim 9, wherein at least one of the first and second level valuator uses an existing data access and table locking functionality of the warehouse table system to determine the user authorization to the source table data or the user locking/unlocking authority; and
wherein the second level valuator further overrides the lock on the table if locked and locks out other users of the information warehouse table during the join by terminating a command that resulted in the overridden table lock or attempts to lock the at least one warehouse table by another locked-out user, and returns an error message in response to a locking process generating the terminated command.

11. The method of claim 10, the command executor performs the full outer join based on the command matching conditions defined by the single query language command statement without executing each of a series of batch flow commands.

12. The method of claim 11, wherein the single query language command statement is an SQL command statement.

13. The method of claim 12, wherein the command executor performs the full outer join by inserting and updating rows in the at least one warehouse table using pre-defined mapping, insert, updating and archival conditions of the data model of the information warehouse to assign respective table values.

14. The method of claim 13, wherein the command executor performs the full outer join by extracting update data from the at least one source table, transforming the extracted data to fit an operational need, and then loading the transformed data into at least one warehouse table without using an intermediate staging table.

15. An article of manufacture, comprising:
a computer readable tangible storage medium having computer readable program code embodied therewith, the computer readable program code comprising instructions that, when executed by a computer processor, cause the computer processor to, in response to a single query language command statement of a relational database computer language comprising table mapping instructions for updating at least one information warehouse table of an information warehouse database system with data from at least one source table that define matching conditions, delete instructions, archive instructions, and update instructions, perform a full outer join between the at least one warehouse table and the at least one source table based on the command matching conditions defined by the single query language command statement by:
for a data row in the at least one source table that does not have a corresponding matching row in the at least one warehouse table, inserting a row in the at least one warehouse table;

for any first data row in the at least one warehouse table that does not have a corresponding matching row in the at least one source table:
- deleting the first data row if a value of a treat history parameter in the warehouse table system is set to delete;
- updating the first data row with update values if the warehouse table system treat history parameter is set to update; and
- updating the first data row with archive values and inserting a new table row into the at least one warehouse table that comprises existing values from the first data row if the warehouse table system treat history parameter is set to archive; and for any second data row in the at least one warehouse table that has a corresponding matching row in the at least one source table:
- updating the second data row with data from the corresponding matching row in the at least one source table; and
- inserting a new table row into the at least one warehouse table comprising existing values from the second data row if the warehouse table system treat history parameter is set to archive.

16. The article of manufacture of claim 15, wherein the computer readable program code instructions, when executed by the computer processor, further cause the computer processor to perform the full outer join between the at least one warehouse table and the at least one source table based on the command matching conditions defined by the single query language command statement without executing each of a series of batch flow commands.

17. The article of manufacture of claim 16, wherein the single query language command statement is an SQL statement.

18. The article of manufacture of claim 17, wherein the computer readable program code instructions, when executed by the computer processor, further cause the computer processor to insert and update the rows in the at least one warehouse table by using pre-defined mapping, insert, updating and archival conditions of the data model of the information warehouse to assign respective table values.

19. The article of manufacture of claim 18, wherein the computer readable program code instructions, when executed by the computer processor, further cause the computer processor to lock out other users from access to or locking the at least one warehouse table during the full outer join between the at least one warehouse table and the at least one source table.

20. The article of manufacture of claim 19, wherein the computer readable program code instructions, when executed by the computer processor, further cause the computer processor to:
- determine if a user providing the SQL command statement has authorization to data in the at least one source table;
- determine if the user providing the SQL command statement is authorized to override a lock on the at least one warehouse table if determined that the user providing the SQL command statement has authorization to the data in the at least one source table;
- override a lock on the at least one warehouse table and lock out other users from locking the at least one warehouse table if determined that the user providing the SQL command statement is authorized to override the lock;
- terminate a command that resulted in the overridden table lock or attempt to lock the at least one warehouse table by another locked-out user; and
- return an error message in response to a locking process generating the terminated command.

* * * * *